(12) United States Patent
Gochenour et al.

(10) Patent No.: US 6,371,266 B1
(45) Date of Patent: Apr. 16, 2002

(54) MODULAR PULL-TYPE RELEASE SYSTEM

(75) Inventors: Daniel V. Gochenour, Auburn; Christopher D. Cole, Ft. Wayne, both of IN (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/560,238

(22) Filed: Apr. 28, 2000

(51) Int. Cl.$^7$ ................................................ F16D 67/02
(52) U.S. Cl. ................... 192/13 R; 192/70.13; 192/98; 192/89.24
(58) Field of Search .............................. 192/98, 70.13, 192/70.27, 89.24, 13 R

(56) References Cited

U.S. PATENT DOCUMENTS

| | | | |
|---|---|---|---|
| 4,646,898 A | | 3/1987 | Muller |
| 4,646,901 A | | 3/1987 | Lassiaz |
| 4,648,499 A | * | 3/1987 | Despres et al. ............... 192/98 |
| 4,667,797 A | * | 5/1987 | Ball ............................. 192/98 |
| 4,691,815 A | * | 9/1987 | Maycock et al. ............. 192/98 |
| 4,733,763 A | | 3/1988 | Gay et al. |
| 4,782,935 A | * | 11/1988 | Gay et al. ..................... 192/98 |
| 5,090,541 A | | 2/1992 | Marchisio |
| 5,423,405 A | | 6/1995 | Fukaya |
| 5,598,911 A | | 2/1997 | Joachim et al. |
| 5,598,912 A | | 2/1997 | Uenohara |
| 5,927,454 A | | 7/1999 | Campbell |

* cited by examiner

*Primary Examiner*—Charles A. Marmor
*Assistant Examiner*—Saúl Rodriguez
(74) *Attorney, Agent, or Firm*—Mitchell M. Musial, II; Loren Hu. Uthoff, Jr.

(57) ABSTRACT

A clutch release mechanism is slideably disposed over a driven shaft to transfer force from a plurality of levers or springs to a pressure plate. The release mechanism is axially displaced to engage or release a clutch. A modular release mechanism disclosed herein comprises a release sleeve which is slideably disposed on a driven shaft, the release sleeve has an axis of rotation, a first end and a second end. The release sleeve has a lever engagement portion disposed at the first end for contact with a release lever. A bearing is disposed about the axis of rotation and has an inward race and an outer race. The release sleeve has a bearing housing portion disposed at the second end for receiving the bearing. The bearing housing portion has a shoulder for locating the bearing therein. The bearing housing portion has a retainer for securing the bearing therein by limiting the axial travel of the bearing relative to the release sleeve when the outer race of the bearing is disposed between the shoulder of the bearing housing portion and the retainer. The release mechanism further comprises a bearing sleeve which has a bearing mount portion for locating a bearing thereon, and a spring support portion for receiving a radially inward portion of either a biasing spring or a lever. The retainer may be selectively engageable in that the retainer is moveable from a first radial position to a second radial position relative to the axis of rotation. The selectively engageable retainer comprises at least one radially extending detent portion which is moveable to a first radial position to a second radial position relative to the axis of rotation by rotating a radially extending lever from a first angular position to a second angular position relative to the release sleeve.

14 Claims, 7 Drawing Sheets

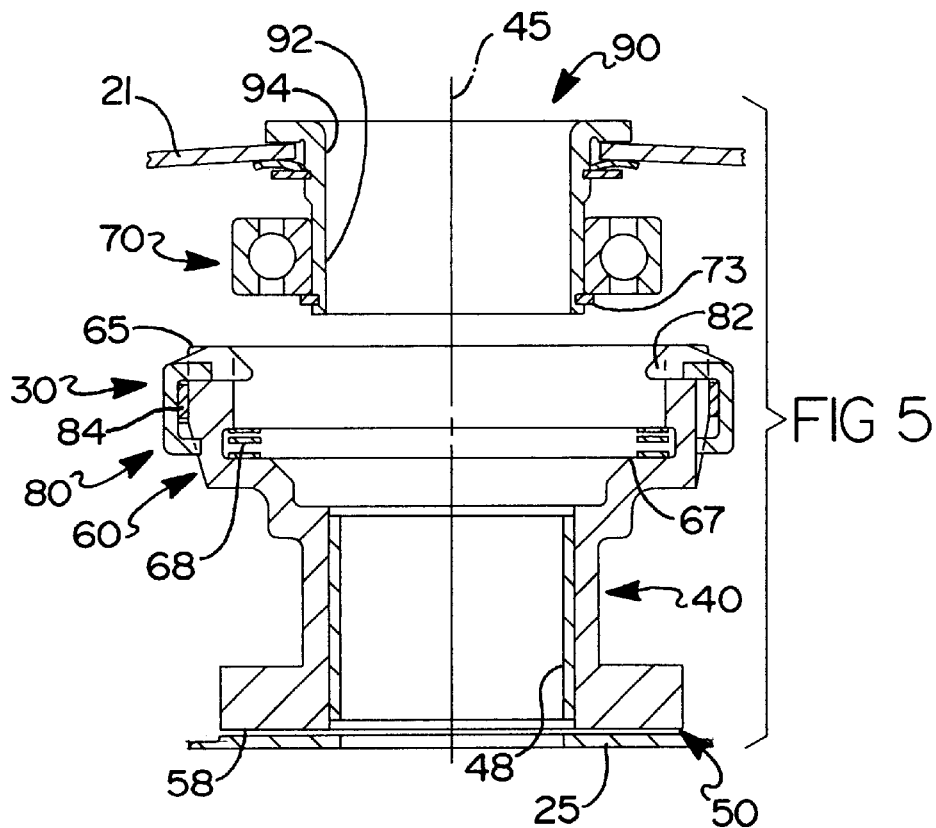
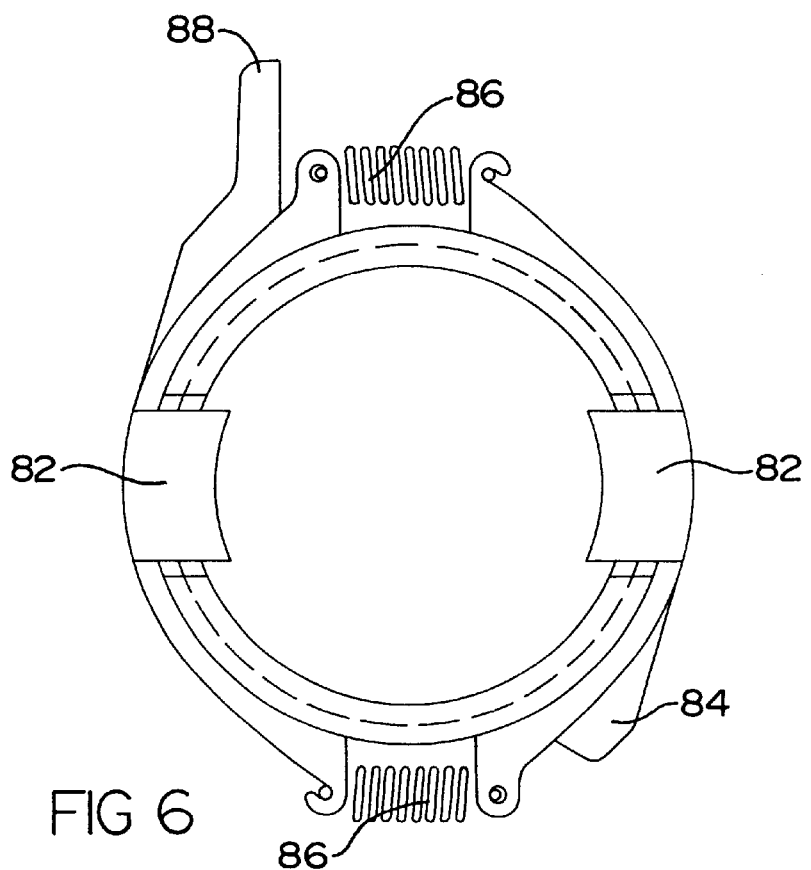

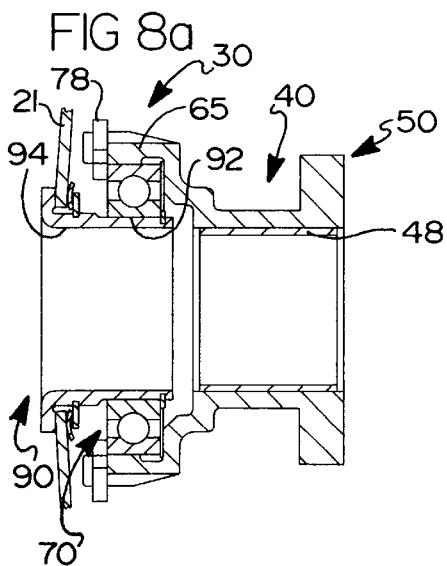
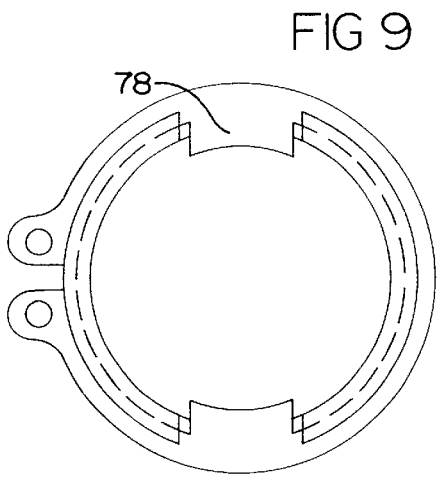
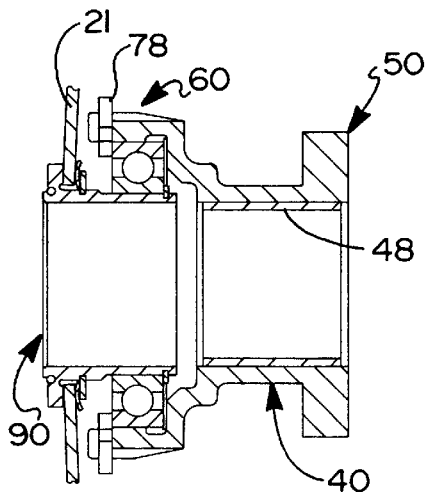
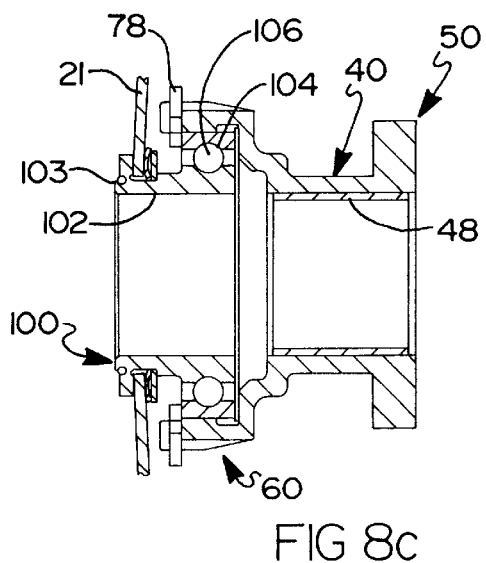

US 6,371,266 B1

MODULAR PULL-TYPE RELEASE SYSTEM

FIELD OF THE INVENTION

This invention relates generally to motor vehicle clutches, and more specifically, to clutches employing a release sleeve disposed between a device for displacing a release bearing and a clutch spring and/or clutch lever.

BACKGROUND OF THE INVENTION

Clutches designed for use in heavy and medium duty applications commonly employ a sleeve that is disposed on a transmission driven shaft. The sleeve connects a device for displacing release bearings, commonly known as a release lever, with a clutch spring and/or clutch levers which provide the clutch engagement load against the pressure plate. The sleeve is disposed over the transmission driven shaft and rotates with the spring, as well as the cover, flywheel and pressure plate of the clutch. A bushing in axial alignment with the bearing is press fit in the sleeve for unitary rotation therewith and rides directly on the transmission driven shaft. Relative rotation between the sleeve and the transmission driven shaft occurs when the clutch is partially or fully released. An inner race of the release bearing is connected to the sleeve for movement therewith. The release bearing has an outer race which is prevented from rotating with respect to the inner race and is engaged with a release lever. The release lever has arms which engage wear pads located on an outer axial surface of a bearing housing. The release lever is pivotally mounted in the clutch housing connecting an engine block and a transmission case. The clutch fork is connected with a clutch pedal by a clutch control system for selective axial displacement of the bearing and sleeve and the resulting disengagement of the clutch by the operator. A clutch brake may be provided on the transmission driven shaft between the bearing housing and the transmission case to stop the rotation of the driven shaft. The clutch brake is engaged when the clutch is fully disengaged by the operator.

Release bearing size is determined by the transmission design. Transmission driven shaft diameter varies among transmission models. Some transmissions include a bearing cap extension, or quill, which the release bearing inner diameter must clear. Therefore, a number of bearing sizes need to be provided to accommodate various transmission designs. Bearing size will also impact the clutch design.

Release bearing life is susceptible to debris in the form of friction material from the driven disc facings and environmental contaminants such as dirt, salt and water. These contaminants can be detrimental to the life of the bearing. Heat from the clutch brake may also result in shortened bearing life. Many clutch designs do not have a serviceable bearing, therefore a bearing failure would require clutch replacement.

A clutch assembly is typically supplied with the release bearing assembly installed. When a clutch is manufactured, one of a plurality of release bearing assemblies may be installed in one clutch assembly, which further complicates the assembly process.

Therefore, it is desirous to provide a release mechanism which can accommodate a variety of transmission designs with a single bearing. It is also desirous to provide a release mechanism which protects the bearing seals from contaminants as well as locating the bearing away from the clutch brake. It is further desirous to provide a clutch release mechanism that facilitates bearing replacement when the bearing is worn or damaged. It is still further desirous to provide a clutch release mechanism that simplifies the clutch manufacturing and assembly process by requiring a minimum number of bearing assemblies to be provided with multiple transmission designs.

SUMMARY OF THE INVENTION

A release mechanism for a clutch includes a release sleeve slideably disposed on a driven shaft, the release sleeve has an axis of rotation, a first end and a second end. A lever engagement portion is disposed at the first end of the release sleeve for contact with a release lever. A bearing is disposed about the axis of rotation and has an inner race and outer race. A bearing housing portion is disposed at the second end of the release sleeve for receiving the bearing. The bearing housing portion has a shoulder for locating the bearing therein. A retainer is disposed at the bearing housing portion for securing the bearing within the bearing housing by limiting the axial travel of the bearing relative to the release sleeve when the outer race of the bearing is disposed between the shoulder of the bearing housing and the retainer. In one embodiment, the release mechanism includes a bearing sleeve which has a bearing mount portion for locating a bearing thereon and a spring portion for receiving a radially inward portion of a biasing spring or a lever. Alternatively, the inner race of the bearing may include a spring support portion for receiving a radially inwardly portion of a biasing spring or lever, disposing of the bearing sleeve all together. Furthermore, a bushing is disposed within an inner radial surface of the release sleeve. A clutch brake may be provided which extends about the driven shaft and disposed adjacent to the contact surface of the release sleeve and axially spaced from the bearing housing portion.

In an alternate embodiment, the release mechanism includes a selectively engageable retainer disposed at the bearing housing portion. The retainer is moveable from a first radial position to a second radial position relative to the axis of rotation. In one embodiment, the selectively engageable retainer comprises at least one radially extending detent portion which is moveable from a first radial position to a second radial position relative to the axis of rotation. A biasing member cooperates with the detent for urging the detent toward one of a first or second radial position. A cam cooperates with the detent where the cam is rotatable from a first angular position to a second angular position relative to the release sleeve. A radially extending lever cooperates with the cam to cause the cam to rotate from a first angular position where the detent is at a first radial position, to a second angular position where the detent is moved to a second radial position.

A clutch includes a driving member having an axis of rotation, a cover coupled to the driving member for rotation therewith and a pressure plate coupled to the cover for rotation therewith. A driven member is coupled to an axially extending driven shaft for rotation therewith. The driven member is interposed between the driving member and the pressure plate. A biasing member is disposed between the pressure plate and the cover to bias the pressure plate toward the driven member. A release sleeve is slideably disposed on a driven shaft, the release sleeve rotates on the axis of rotation and has a first end and a second end. A lever engagement portion is disposed at the first end of the release sleeve for contact with the release lever. A bearing is disposed about the axis of rotation and had an inner race and outer race. A bearing housing portion is disposed at the second end of the release sleeve for receiving the bearing. The bearing housing portion has a shoulder for locating a bearing therein. A retainer is disposed at the bearing housing portion for securing the bearing within a bearing housing by limiting the axial travel of the bearing relative to the release sleeve when the outer race of the bearing is disposed between the shoulder of the bearing housing portion and the retainer.

Other objects and features of the invention will become apparent to those skilled in the art as disclosure is made in the following detailed description of a preferred embodiment of the invention which sets forth the best mode of the invention contemplated by the inventors and which is illustrated in the accompanying sheets of drawings and the appended claims.

BRIEF DESCRIPTION OF THE DRAWINGS

FIG. 5 is an exploded cross-sectional view of one embodiment of the release mechanism of the present invention.

FIG. 6 is a plan view of one embodiment of a retainer according to the principals of the present invention

FIG. 8A is a cross-sectional view of an alternate embodiment of the present invention where the retainer is an expandable spring clip.

FIG. 8B is a cross-sectional view of yet another alternate embodiment of the present invention where the bearing sleeve extends beyond the spring support portion.

FIG. 8C is a cross-sectional view of still yet another alternate embodiment of the present invention where an extended inner race includes a spring support portion.

FIG. 9 is one embodiment of a retainer according to the present invention.

DETAILED DESCRIPTION OF THE PREFERRED EMBODIMENT

Figure 1:
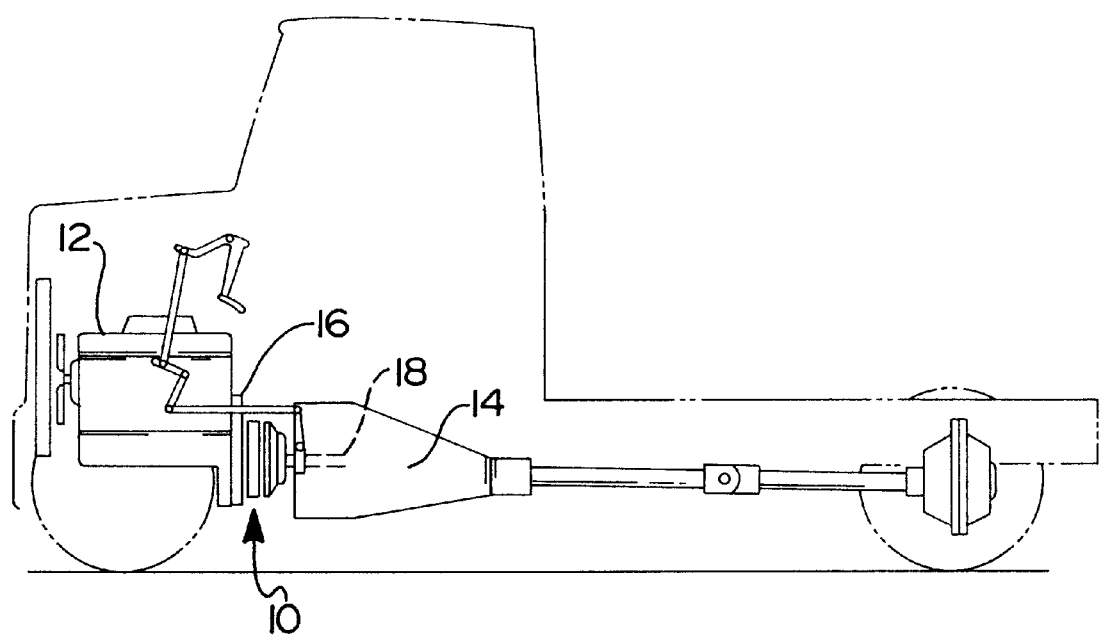
FIG. 1 is an environmental view of a drive train, including an engine, transmission and a clutch mounted in a heavy duty vehicle.
Figure 2:
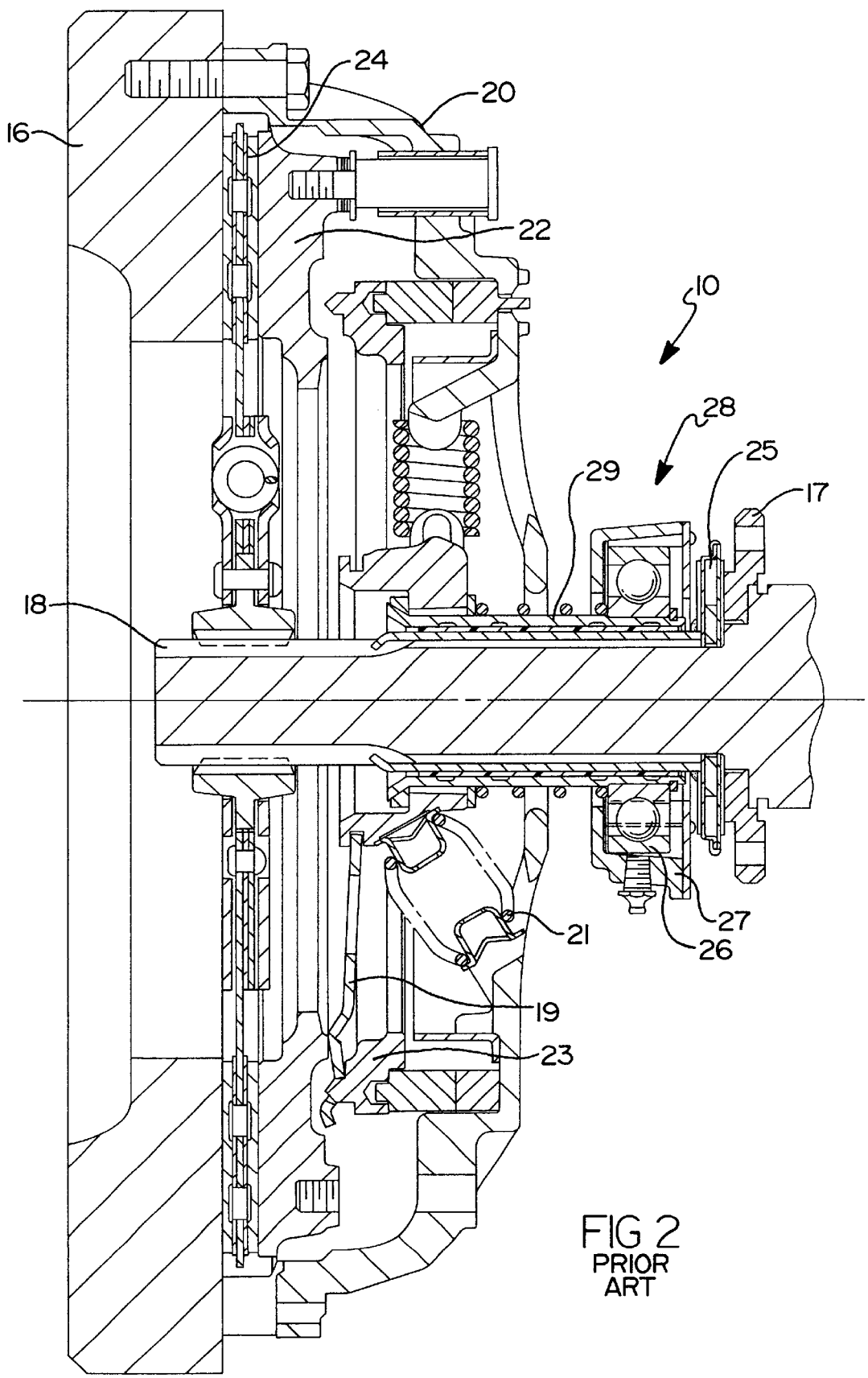
FIG. 2 is a cross-sectional view of a clutch embodying a release assembly representing the current state of the art.

Referring now to FIG. 1, a friction drive or clutch 10 is disposed between an engine 12 and a transmission 14. A clutch control system 15 is used to selectively disengage and engage clutch 10 by a vehicle operator. A flywheel 16 is rotatably coupled to the engine's crankshaft for unitary rotation therewith. Transmission 14 includes a driven shaft 18. Referring now to FIG. 2, a clutch 10 having a conventional release mechanism 28 is shown. Clutch 10 includes a driven member 24 that is slideably disposed over driven shaft 18 for unitary rotation therewith. Driven member 24 is axially disposed between flywheel 16 and pressure plate 22. Pressure plate 22 is rotatably connected to flywheel 16 through a cover 20. A biasing spring 21 provides force to urge pressure plate 22 toward flywheel 16 to compress driven member 24 between pressure plate 22 and flywheel 16 causing driven shaft 18 to rotate as a unit with flywheel 16 and pressure plate 22. Cover 20 is mounted directly to flywheel 16 and substantially encloses pressure plate 22. Conventional release mechanism 28 is slideably disposed over driven shaft 18. Biasing springs 21 are disposed between the release mechanism 28 and cover 20. A plurality of levers 19 are interposed between the conventional release mechanism 28 and a fulcrum ring 23. The levers 19 are used to transfer spring force from the release mechanism 28 to pressure plate 22. The lever 19 provides force to the pressure plate 22 by making contact therewith at an intermediate point between fulcrum ring 23 and release mechanism 28.

The conventional release mechanism 28 includes a bearing housing 27 connected to a release sleeve 29. A release bearing 26 is disposed within bearing housing 27. A clutch brake 25 is disposed upon the driven shaft 18 between the bearing housing 27 and a transmission case 17. It can be readily observed that when the clutch brake 25 is engaged, heat is transferred through the bearing housing 27 to the bearing 26. The release sleeve 29 is one piece and couples the release bearing 26 to the biasing spring 21 and/or levers 19.

Figure 3:
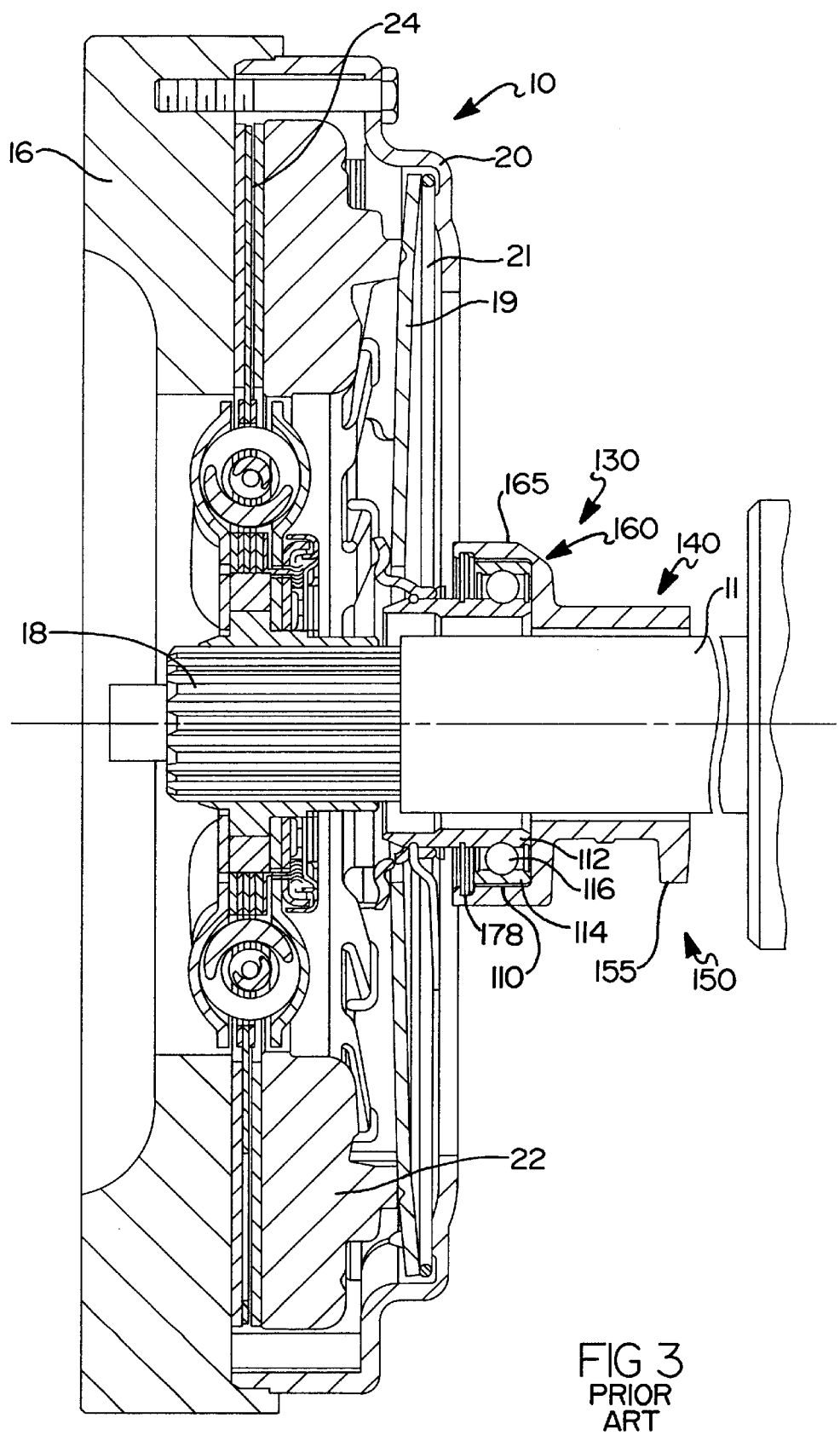
FIG. 3 is a cross-sectional view of a clutch embodying another release mechanism representing the current state of the art.

Referring now to FIG. 3, a clutch 10 is shown incorporating another embodiment of a conventional release mechanism 130. In the preferred embodiment, release mechanism 30, as shown in FIG. 8C, may be substituted for conventional release mechanism 130, and may be disposed on a bearing cap extension 11, although it should be noted that the release mechanism 30 of the present invention may be disposed directly on driven shaft 18 without incorporating bearing cap extension 11. Clutch 10 disclosed in FIG. 3 includes components common to frictional clutch known in the art, including a flywheel 16, driven member 24, pressure plate 22, cover 20, lever 19 and biasing spring 21. Although, the biasing spring 21 shown in FIG. 3 is a diaphragm spring, those skilled in the art will readily recognize that suitable substitutions exist for a diaphragm spring, such as one or more coil springs. The release mechanism 130 includes a release sleeve 140 having a first end 150 and a second end 160. A lever engagement portion 155 is disposed at the first end 150 and a bearing housing portion 165 is disposed at the second end 160 of release sleeve 140. A release bearing 110 is shown coupled to the release sleeve 140 within the bearing housing portion 165 by a retainer 178. In the present embodiment, the bearing 110 has an inner race 112 and an outer race 114 separated by bearing members 116. The inner race 112 is extended and receives biasing spring 21 and lever 19.

Figure 4:
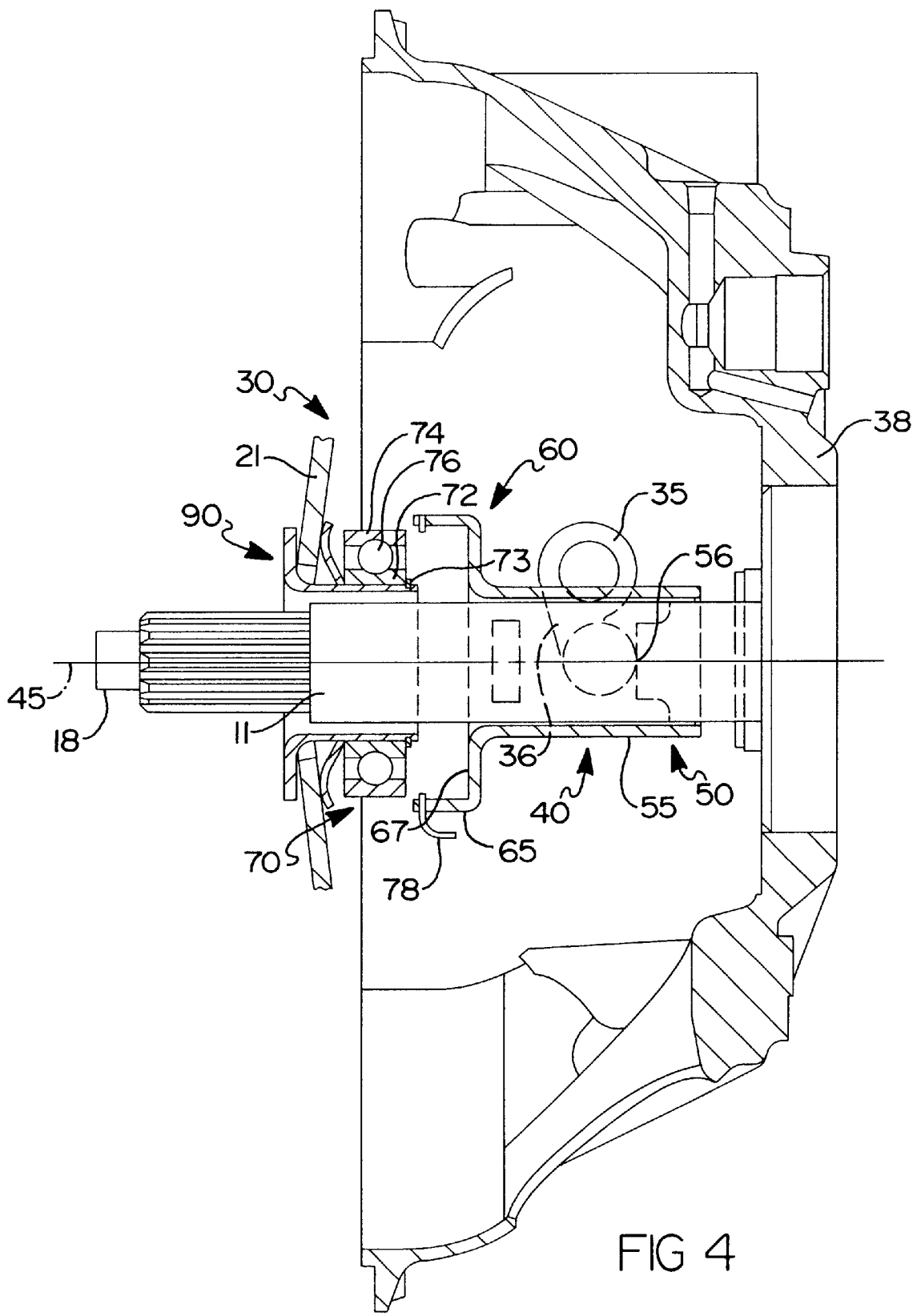
FIG. 4 is a cross-sectional view of a transmission housing having one embodiment of the release mechanism of the present invention therein revealing a release sleeve and a bearing sleeve in an uncoupled state.

Referring now to FIG. 4, the release mechanism 30 of the present invention is shown disposed within a clutch housing with many of the common clutch components removed. The release sleeve 40 has a lever engagement portion 55 disposed at the first end 50 for contact with a release lever 35. Lever engagement portion 55 may include wear pads 56 for contact with arms 36 of release lever 35. A bearing housing portion 65 is disposed at the second end 60 of the release sleeve 40 for receiving a release bearing 70. The bearing housing portion 65 has a shoulder 67 for locating the bearing 70 therein. Release bearing 70 is disposed about an axis of rotation 45 and has an inner race 72 and an outer race 74. The inner race 72 rotates with the pressure plate (not shown in FIG. 4). Referring now also to FIG. 5, a damping member 68 may be disposed adjacent to shoulder 67 to prevent axial movement of the bearing 70 with respect to the release sleeve 40. Damping member 68 may be a Belleville washer or any other suitable biasing device.

Referring now to FIG. 5, bearing 70 is coupled to release sleeve 40 by a retainer 80 disposed at the bearing housing portion 65. The bearing 70 is secured within bearing housing portion 65 by limiting the axial travel of bearing 70 relative to release sleeve 40 when bearing 70 is disposed between shoulder 67 of the bearing housing portion 65 and retainer 80.

In one embodiment, a retainer 78 is an expandable clip, as can be seen in FIGS. 4 and 9. Alternatively, retainer 80 is disclosed as a selectively engageable, as shown in FIGS. 5 and 6. Referring now to FIGS. 5 and 6 retainer 80 comprises at least one radially extending detent 82 to retain bearing 70 within the bearing housing portion 65 of release sleeve 40. Detent 82 is selectively moveable from a first radial position to a second radial position relative to the axis of rotation 45. A biasing member 86 is provided to urge detent 82 toward one of an inward or outward radial position relative the axis of rotation 45. In the exemplary embodiment, biasing members 86 are provided to urge detent 82 toward an inward axial position. A cam 84 which is rotatable from a first angular position to a second angular position, relative to the release sleeve 40 cooperates with detent 82. Cam 84 has a profile which causes detent 82 to move from a first radial position to a second radial position when cam 84 is rotated from a first angular position to a second angular position. A radially extending lever 88 cooperates with cam 84. Rotating lever 88 relative to release sleeve 40 causes detent 82 to move from a first radial position to a second radial position relative to the axis of rotation 45. Lever 88 is selectively engageable to allow coupling and uncoupling of the release bearing 70 to the release sleeve 40.

Referring now to FIG. 5, a bearing sleeve 90 includes a bearing mount portion 92 and a spring support 94 for cooperating with a biasing spring 21. Inner race 72 of bearing 70 is disposed upon bearing sleeve 90 for axial movement therewith. An annular ring 73, such as a snap ring, is provided to retain inner race 72 on bearing sleeve 90. Bearing sleeve 90 has an axis of rotation 45 and is disposed about driven shaft 18. In one embodiment, a clutch will be installed having bearing sleeve 90 operatively disposed therewith. In operation, release sleeve 40 is coupled to bearing sleeve 90 through bearing 70. Bearing sleeve 90 is designed to clear various driven shaft diameters and functions with release sleeve 40 and release bearing 70 to facilitate release of a clutch 10 as shown in FIG. 3.

Referring now to FIG. 4, a transmission housing 38 is installed in a vehicle with release lever 35 pivotally mounted therein. Release lever 35 has a pair of extending arms 36 which straddle release sleeve 40 to selectively contact lever engagement portion 55. Typically, wear pads 56 are provided for contact with arms 36 of release lever 35.

Figure 7A:
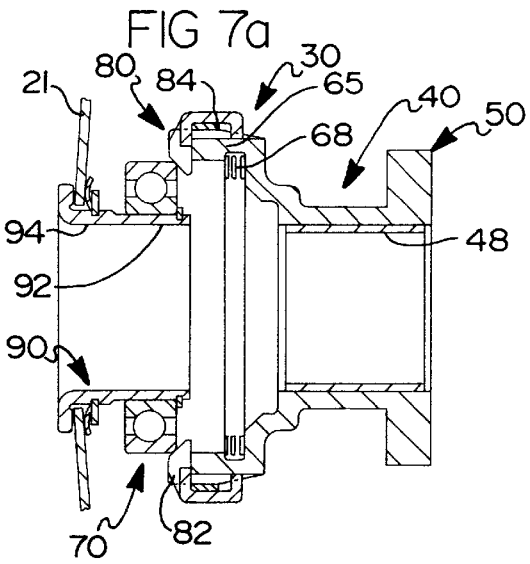
FIG. 7A is a cross-sectional view of a release assembly of the present invention prior to mating the bearing with the bearing housing portion.

Coupling or uncoupling of release sleeve 40 and bearing sleeve 90 of the exemplary embodiment is revealed by reference to FIGS. 7A through 7D. Referring first to FIGS. 7A and 4, bearing housing portion 65 of release sleeve 40 is translated along driven bearing cap extension 11 until retainer 80 engages bearing 70. Referring now also to FIG. 6, a radially extending lever 88 is rotated from a first angular position to a second angular position relative to release sleeve 40. Lever 88 cooperates with cam 84 to cause cam 84 to rotate from a first angular position to a second angular position relative to release sleeve 40. Rotation of cam 84 from a first angular position to a second angular position relative to release sleeve 40 causes a pair of detents 82 to move from a first radial position to a second radial position relative to axis of rotation 45. Cam 84 has a profile which causes a pair of detents 82 to expand inward or outward relative to the axis of rotation 45. In the preferred embodiment, a pair of biasing members 86 are provided to urge detents 82 toward a radially inward position.

Figure 7B:
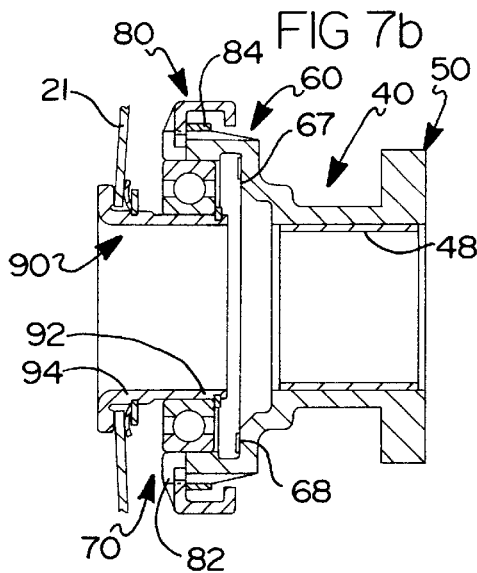
FIG. 7B is a cross-sectional view of a release assembly of the present invention where the bearing is engaging the bearing housing.
Figure 7C:
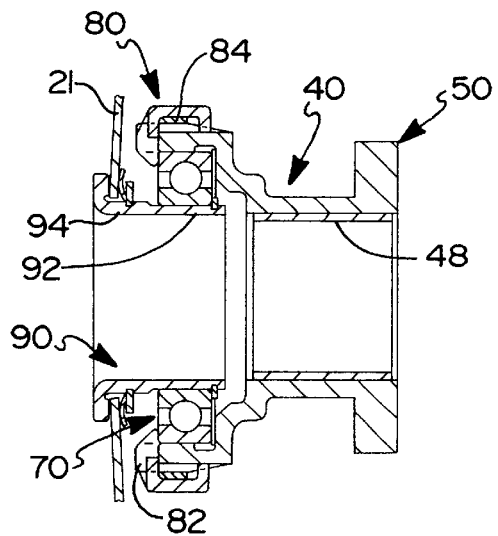
FIG. 7C is a cross-sectional view of a release assembly of the present invention where the bearing is disposed between a shoulder of the bearing housing and the retainer where the retainer is in an inward axial position.
Figure 7D:
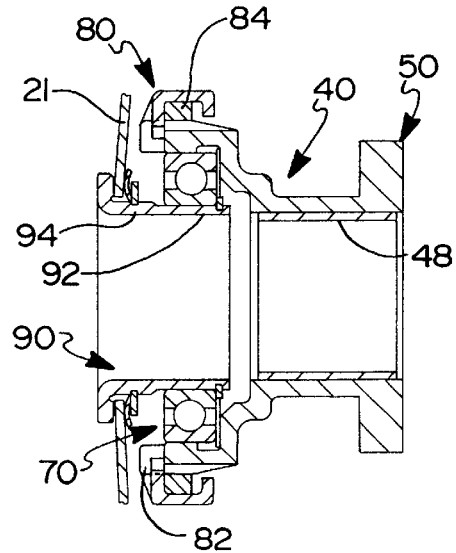
FIG. 7D is a cross-sectional view of a release assembly of the present invention where the bearing is disposed within the bearing housing and the retainer is in an outer radial position to release the bearing from the release sleeve.

Bearing housing portion 65 is coupled to bearing 70 by moving detents 82 to an outward radial position to allow bearing 70 to be inserted within bearing housing portion 65. Referring now to FIG. 7B, detents 82 are shown in an outer radial position to permit release sleeve 40 to traverse an additional axial distance in order for release bearing 70 to penetrate bearing housing 65. Referring now to FIG. 7C, release sleeve 40 is operatively positioned when shoulder 67 is adjacent to outer race 74 of bearing 70. Referring now to FIG. 7D, detents 82 of retainer 80 are engaged in a radially inward position to secure bearing 70 within the bearing housing portion 65 by limiting the axial travel of bearing 70 relative to release sleeve 40.

Referring now to FIG. 8A, an alternate embodiment of the release mechanism 30 of the present invention is shown. Bearing housing portion 65 includes a retainer 78 for securing release bearing 70 therein. Retainer 78, which can be seen more clearly in FIG. 9, is a snap ring. Retainer 78 functions in the same way as retainer 80, as shown in FIG. 7D, in so far as maintaining bearing 70 within bearing housing portion 65. Retainer 78 is distinguished from retainer 80 of FIG. 7D in that retainer 80 is a quick release retainer. A tool (not shown) is required to expand retainer 78 to allow for insertion or removable of bearing 70, as shown in FIG. 8B.

Bearing sleeve 90 as shown in FIGS. 7A through 8A may be formed by a stamping process, or may be formed by a casting process and machined to produce a bearing sleeve 90 as shown in FIG. 8B. It should become apparent to those skilled in the art that any suitable manufacturing process may be employed to manufacture release sleeve 40 and bearing sleeve 90.

Referring now to FIG. 8C, in an alternate embodiment, a bearing 100 is shown having an extended inner race 102 separated from outer race 104 by bearing member 106. Inner race 102 includes a spring support portion 103 which receives biasing spring 21. In the event that a bearing with an extended inner race, such as bearing 100 disclosed in FIG. 8C is desired, bearing sleeve 90 as shown in FIG. 8B may be eliminated.

Referring now to FIGS. 4 and 5, in the preferred embodiment release sleeve 40, release bearing 70 and bearing sleeve 90 are standardized. A bushing 48 is press fit within release sleeve 40 to obtain a desired clearance between an inner diameter of bushing 48 and driven shaft 18 or bearing cap extension 11. Significant cost reductions can be achieved by standardizing release bearing 70. Furthermore, tooling and part cost reductions may also be achieved by standardizing release sleeve 40 and bearing sleeve 90.

Referring still to FIGS. 4 and 5, bearing housing portion 65 prevents dust and debris from contacting release bearing 70. Lever engagement portion 55 is axially spaced from bearing housing portion 65, therefore release lever 35 is not limited by the size of release bearing 70.

A clutch brake 25, as shown in FIG. 5, may be employed with the release mechanism 30 of the present invention. The clutch brake 25 is operatively disposed on driven shaft 18 between a contact surface 58 of lever engagement portion 55 and transmission case 17. Contact surface 58 is axially spaced from bearing housing portion 65, therefore heat created by clutch brake 25 is not transferred to release bearing 70.

Release mechanism 30 of the present invention allows a clutch 10 to be ordered, assembled and installed without having to size bearing 70 to the diameter of the driven shaft 18. In the event bearing 70 needs to be replaced, release sleeve 40 can be reused if not damaged. Furthermore, the bearing 70 may be replaced without replacing the clutch.

It should become apparent to those skilled in the art that the release assembly 30 of the present invention may be employed with any release system known in the art, including, but not limited to, mechanical release systems, hydraulic release systems, hydraulic release systems with air assist and hydraulic release systems with air assisted clutch brakes.

The foregoing discussion discloses and describes the preferred embodiment of the present invention. However, one skilled in the art will readily recognize from such discussion and from the accompanying drawings and claims that various changes, modifications and variations can be made therein without departing from the true spirit and fair scope of the invention as defined in the following claims.

What is claimed is:

1. A release mechanism for a clutch, comprising:
   a release sleeve slidably disposed on a driven shaft, said release sleeve having an axis of rotation, a first end and a second end;
   a lever engagement portion disposed at the first end of said release sleeve for contact with a release lever;
   a bearing disposed about the axis of rotation having an inner race and an outer race;
   a bearing housing portion disposed at the second end of said release sleeve for receiving said bearing, said bearing housing portion having a shoulder for locating said bearing therein; and
   a retainer disposed at said bearing housing portion, said retainer having at least one radially extending detent portion which is movable from a radially inward position to a radially outward position relative to the axis of rotation, said retainer securing said bearing within the bearing housing by engaging said detent in a radially inward position, limiting the axial travel of said bearing relative to said release sleeve when said outer race of said bearing is disposed between said shoulder of said bearing housing portion and said retainer.

2. The release mechanism of claim 1, further comprising a bearing sleeve having a bearing mount portion for locating said bearing thereon, and a spring support portion for receiving a radially inward portion of one of a biasing spring or lever.

3. The release mechanism of claim 1, wherein said inner race includes a spring support portion for receiving a radially inward portion of one of a biasing spring or lever.

4. The release mechanism of claim 1, further comprising a bushing disposed within an inner radial surface of said release sleeve.

5. The release mechanism of claim 1, further comprising a clutch brake extending about the driven shaft, said clutch brake disposed adjacent to a contact surface of said release sleeve, said contact surface axially spaced from said bearing housing portion.

6. The release mechanism of claim 1, further comprising a bearing cap extension extending between said release sleeve and the driven shaft.

7. A release mechanism for a clutch, comprising:
   a release sleeve slidably disposed on a driven shaft, said release sleeve having an axis of rotation, a first end and a second end;
   a lever engagement portion disposed at the first end of said release sleeve for contact with a release lever;
   a bearing disposed about the axis of rotation having an inner race and an outer race;
   a bearing housing portion disposed at the second end of said release sleeve for receiving said bearing, said bearing housing portion having a shoulder for locating said bearing therein; and
   a selectively engageable retainer disposed at said bearing housing portion, said retainer having at least one radially extending detent portion which is movable from a first radial position being one of a radially inward position or a radially outward position relative to the axis of rotation to a second radial position being the other of a radially inward position or a radially outward position relative to the axis of rotation, said retainer securing said bearing to said release sleeve by engaging said detent in a radially inward position, limiting the axial travel of said bearing relative to said release sleeve when said outer race of said bearing is disposed between said shoulder of said bearing housing portion and said retainer.

8. The release mechanism of claim 7, wherein said retainer comprises a biasing member cooperating with said detent, said biasing member for urging said detent toward one of a first or second radial position, a cam cooperating with said detent, said cam rotatable from a first angular position to a second angular position relative to said release sleeve, a radially extending lever cooperating with said cam to cause said cam to rotate from a first angular position where said detent is at a first radial position, to a second angular position where said detent is moved to a second radial position.

9. A clutch, comprising:
   a driving member having an axis of rotation;
   a cover coupled to said driving member for rotation therewith;
   a pressure plate coupled to said cover for rotation therewith;
   a driven member coupled to an axially extending driven shaft for rotation therewith, said driven member interposed between said driving member and said pressure plate;
   a biasing member disposed between said pressure plate and said cover biasing said pressure plate toward said driven member;
   a release sleeve slidably disposed on a driven shaft, said release sleeve having an axis of rotation, a first end and a second end;
   a lever engagement portion disposed at the first end of said release sleeve for contact with a release lever;
   a bearing disposed about the axis of rotation having an inner race and an outer race;
   a bearing housing portion disposed at the second end of said release sleeve for receiving said bearing, said bearing housing portion having a shoulder for locating said bearing therein; and a retainer disposed at said bearing housing portion, said retainer having at least one radially extending detent portion which is movable from a radially inward position to a radially outward position relative to the axis of rotation, said retainer securing said bearing within the bearing housing by engaging said detent in a radially inward position, limiting the axial travel of said bearing relative to said release sleeve when said outer race of said bearing is disposed between said shoulder of said bearing housing portion and said retainer.

10. The clutch of claim 9, further comprising a bearing sleeve having a bearing mount portion for locating a bearing thereon, and a spring support portion for receiving a radially inward portion of one of a biasing spring or lever.

11. The clutch of claim 9, wherein said inner race includes a spring support portion for receiving a radially inward portion of one of a biasing spring or lever.

12. The clutch of claim 9, further comprising a bushing disposed within an inner radial surface of said release sleeve.

13. The clutch of claim 9, further comprising a clutch brake extending about the driven shaft, said clutch brake disposed adjacent to a contact surface of said release sleeve, said contact surface axially spaced from said bearing housing portion.

14. The clutch of claim 9, further comprising a bearing cap extension extending between said release sleeve and the driven shaft.

* * * * *